May 13, 1924.
P. E. WELTON
1,493,716
PNEUMATIC TIRE GAUGE
Filed Jan. 17, 1923
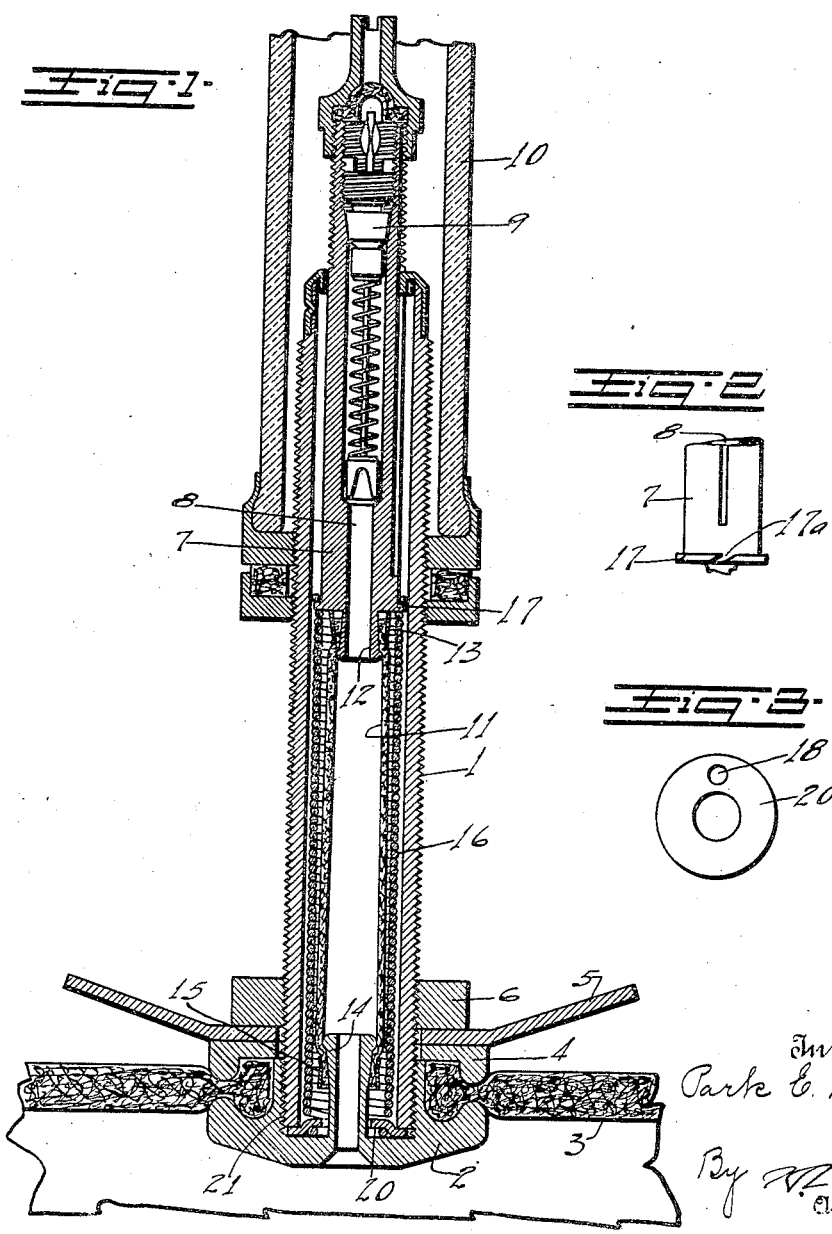
Inventor
Parke E. Welton
By
Attorney Patented May 13, 1924.

1,493,716

UNITED STATES PATENT OFFICE.

PARK E. WELTON, OF CUYAHOGA FALLS, OHIO, ASSIGNOR TO TIREGAGE VALVE CORPORATION, OF CHARLESTON, WEST VIRGINIA, A CORPORATION OF WEST VIRGINIA.

PNEUMATIC-TIRE GAUGE.

Application filed January 17, 1923. Serial No. 613,254.

*To all whom it may concern:*

Be it known that I, PARK E. WELTON, a citizen of the United States, residing at Cuyahoga Falls, in the county of Summit and State of Ohio, have invented new and useful Improvements in Pneumatic-Tire Gauges, of which the following is a specification.

Tire pressure gauges have been formed with a tire stem and sliding plunger which plunger is connected with the stem and subjected to the tire pressure indicating by its movement said pressure. These devices as ordinarily constructed are provided with a coil spring which resists the movement of the plunger so that its position will properly indicate the tire pressure. One of the problems of such construction is the proper anchoring of the inner end of the spring and the present invention is directed more particularly to the manner of securing the spring.

The invention is illustrated in the accompanying drawings as follows:—

Fig. 1 shows a central section of a pressure gauge.

Fig. 2 an enlarged view of the lower end of the plunger showing the method of securing the spring to the plunger.

Fig. 3 an enlarged view of the anchoring plate for the spring.

1 marks the tire stem, 2 the head on the stem, 3 the tire tube, 4 the clamping plate, 5 the spreader, and 6 the clamping nut. A plunger 7 is slidingly mounted in the stem. This has an inflation opening 8 extending through it and carries an inflation valve 9. A transparent cap 10 is provided through which the position of the plunger may be observed so as to ascertain the pressure to which it is subjected.

A rubber tube 11 is secured to a nipple 12 arranged on the end of the plunger 7 by a band 13. The lower end of the tube is secured to a nipple 14 extending upwardly from the head 2 by a band 15.

A spring 16 is secured to the plunger by means of a shoulder 17, the shoulder having a slot 17ª through which the spring extends, one or more of the coils being arranged above the shoulder.

The lower end of the spring has its end passed through an opening 18 in a washer-shaped plate 20. This plate is clamped under the end of the stem 1 which is screwed into a screw-threaded socket 21 in the head. Preferably the clamping action is sufficient to distort the plate 20 as clearly indicated in the drawings and thus more firmly secure and clamp the end coil of the spring under the plate.

What I claim as new is:—

1. In a pneumatic tire gauge, the combination with a stem; a valve carrying plunger in the stem, said plunger being connected with the inner end of the stem and subjected to tire pressure of a coil spring secured to the plunger and resisting the movement of the plunger; a metal plate having an opening off-set from the axis of the spring through which the end of the spring extends; and means for clamping the plate in the stem.

2. In a pneumatic tire gauge, the combination with a stem; a valve carrying plunger in the stem, said plunger being connected with the inner end of the stem and subjected to tire pressure, of a coil spring secured to the plunger and resisting the movement of the plunger; a metal plate having an opening off-set from the axis of the spring through which the end of the spring extends; and means for clamping the plate in the stem and on the end coil of the spring.

3. In a pneumatic tire gauge, the combination with a stem; a valve carrying plunger in the stem, said plunger being connected with the inner end of the stem and subjected to tire pressure, of a coil spring secured to the plunger and resisting the movement of the plunger; a metal plate having an opening off-set from the axis of the spring through which the end of the spring extends; and means for clamping the plate in the stem and on the end coil of the spring, said means distorting the plate on said end coil.

4. In a pneumatic tire gauge, the combination of a stem comprising a screw-threaded sleeve; a head having a screw threaded socket into which the sleeve is screwed; a valve carrying plunger slidingly mounted in the stem, said plunger being connected with the inner end of the stem and subjected to tire pressure; a spring secured to the plunger; and a plate having an opening off-set from the axis through which the end of the spring extends, said plate being clamped in the screw-threaded socket under the end of the sleeve.

5. In a pneumatic tire gauge, the combination of a stem comprising a screw-threaded sleeve; a head having a screw-threaded socket into which the sleeve is screwed; a valve carrying plunger slidingly mounted in the stem, said plunger being connected with the inner end of the stem and subjected to tire pressure; a spring secured to the plunger; and a plate having an opening off-set from the axis through which the end of the spring extends, said plate being clamped in the screw-threaded socket under the end of the sleeve, said clamping action distorting the plate on the end coil of the spring.

In testimony whereof I have hereunto set my hand.

PARK E. WELTON.